United States Patent [19]
Botto et al.

[11] Patent Number: 5,745,549
[45] Date of Patent: Apr. 28, 1998

[54] LINE BREAK DETECTION DEVICE AND MODEM COMPRISING SUCH A DEVICE

[76] Inventors: Jean-Luc Botto, 5, place Jules Ferry, 92120 Montrouge; Walid Hachem, 39, boulevard Garibaldi, 75015 Paris, both of France

[21] Appl. No.: 769,604

[22] Filed: Dec. 19, 1996

Related U.S. Application Data

[63] Continuation of Ser. No. 302,567, Sep. 8, 1994.

[30] Foreign Application Priority Data

Sep. 13, 1993 [FR] France .................. 93 10868

[51] Int. Cl.$^6$ .................. H04M 1/24; H04M 3/22; H04M 9/08
[52] U.S. Cl. .................. 379/34; 379/3; 379/410; 379/411; 370/291
[58] Field of Search .................. 379/1, 3, 32–34, 379/98, 377, 406, 410, 411, 93, 96, 100; 375/222; 370/289, 291, 286, 287

[56] References Cited

U.S. PATENT DOCUMENTS

| | | | |
|---|---|---|---|
| 4,311,882 | 1/1982 | Johner | 379/34 |
| 4,539,675 | 9/1985 | Fisher | 379/411 |
| 4,607,146 | 8/1986 | Haass | 379/402 |
| 4,782,512 | 11/1988 | Hutton | 379/98 |
| 4,969,178 | 11/1990 | Chen | 379/33 |
| 4,970,715 | 11/1990 | McMahan | 379/410 |
| 4,972,368 | 11/1990 | O'Brien | 369/900 |
| 4,972,406 | 11/1990 | Dedic | 370/286 |
| 4,985,919 | 1/1991 | Naruse | 379/100 |
| 4,996,703 | 2/1991 | Gray | 379/51 |
| 5,016,271 | 5/1991 | Ford | 379/410 |
| 5,063,563 | 11/1991 | Ikeda | 379/32 |
| 5,163,044 | 11/1992 | Golden | 379/411 |
| 5,193,112 | 3/1993 | Sano | 379/406 |
| 5,222,119 | 6/1993 | Asano | 379/32 |
| 5,495,470 | 2/1996 | Tyburski | 370/14 |
| 5,528,661 | 6/1996 | Siu | 379/1 |

FOREIGN PATENT DOCUMENTS

| | | |
|---|---|---|
| 0318105 | 5/1989 | European Pat. Off. |
| 4150525 | 10/1990 | Japan |

*Primary Examiner*—Curtis Kuntz
*Assistant Examiner*—Vijay Shankar
*Attorney, Agent, or Firm*—Venable, Baetjer, Howard & Civiletti, LLP

[57] ABSTRACT

A modem for transmission and reception of data samples over a transmission line includes a transmission line break detection device having a correlation meter for providing a measure of the degree of correlation between transmitted and received data samples. Such device further includes a threshold meter for triggering a line break alarm when the correlation exceeds a threshold value. The correlation relates to a limited number of data samples occurring during a portion of an echo period for reception of an echo of transmitted data samples.

4 Claims, 1 Drawing Sheet

LINE BREAK DETECTION DEVICE AND MODEM COMPRISING SUCH A DEVICE

This is a continuation of application Ser. No. 08/302,567, filed Sep. 8, 1994.

BACKGROUND OF THE INVENTION

1. Field of the Invention

The present invention relates to a transmission system comprising a modem connected to a far-end modem by a transmission line, at least one of the modems comprising a line break detection device with a correlation meter for measuring a quantity representing the correlation between transmitted and received data and a threshold meter for triggering a line break alarm when this quantity exceeds a threshold value L.

2. Description of the Related Art

This type of device is known and on this subject Japanese Patent Application 4-150525, filed 12 Oct. 1990 can be consulted. This type of device is to cooperate with modems which comprise at least an echo canceller. This type of device has for its object to solve the problem of a break of the line connecting a near-end modem with a far-end modem. In the case of line break, echo cancellers, although they find themselves suddenly no longer adapted, can attune very rapidly to this new situation and this calls forth a risk of an alarm not being raised for a rather long period of time, for example, for several minutes. This period of time lost is detrimental to the user who pays for the occupation of a line which in fact no longer transmits information signals. Furthermore, if urgent problems are linked with this line, there is also time lost for finding another transmission line.

In the prior-art device the dedicated echo cancellers are used to the full, which implies much computation.

SUMMARY OF THE INVENTION

The invention provides a device of the type defined above which produces an alarm signal in a shorter period of time of the order of 10 seconds after a line break, without the need for much computation.

Therefore, such a device is characterized in that the correlation relates to a limited sample range which corresponds to the time of an echo signal.

BRIEF DESCRIPTION OF THE DRAWINGS

The following description accompanied by the appended drawings, all given by way of non-limiting example, will provide a more complete understanding of the invention. In the drawings.

DESCRIPTION OF THE PREFERRED EMBODIMENTS

Figure 1:
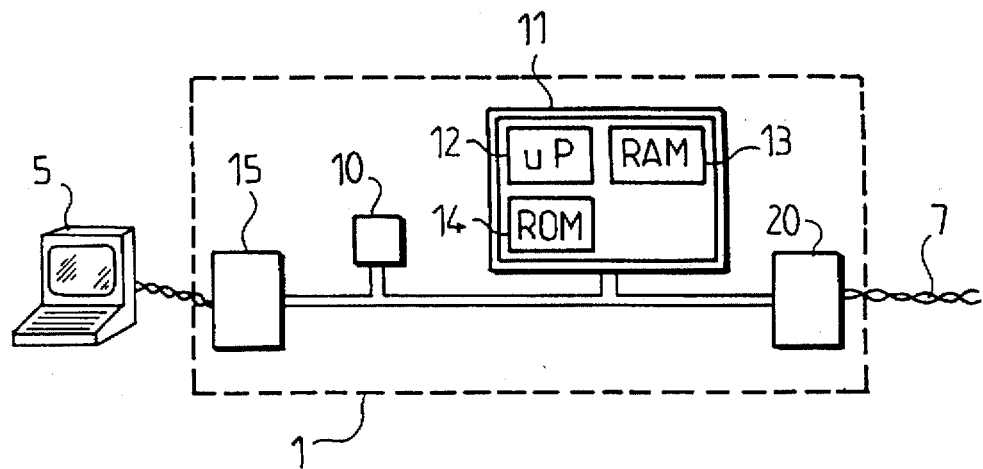
FIG. 1 shows the structure of a modem comprising a line break detection device according to the invention.

The modem 1 shown in FIG. 1 interconnects a digital terminal 5 and a telephone-type transmission line 7.

This modem is formed based upon processor units 10 and 11. The processor unit 10 is assigned to managing the modem and processor unit 11 comprises, as is customary, a microprocessor 12, a random-access memory 13 and a read-only memory 14 containing the program instructions which implement the invention. A first interface circuit 15 connects the modem 1 and user terminal 5. A second interface circuit 20 transforms the signals coming from the telephone line 7 into digital signals and also performs the reverse operation. Such a circuit is described in European Patent Specification EP 0 318 105.

The processor unit 11 performs various functions, and in particular that of an echo canceller. This function is shown in the form of operational blocks in FIG. 2.

Figure 2:
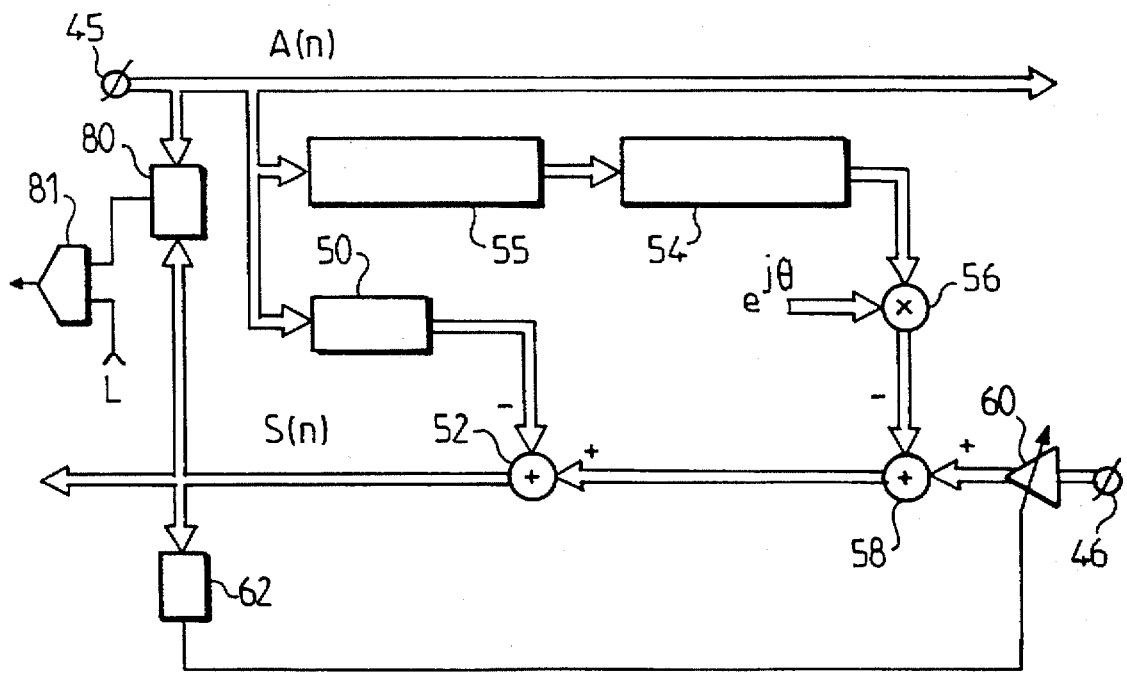
FIG. 2 is a block diagram relating to explanation of the operation of the detection device according to the invention.

In FIG. 2 the terminal 45 denotes the access of the data A(n) which are intended to be transmitted and 46 the access at which the data are received. A transversal filter 50 multiplies various samples of the time-shifted transmitted data A(n) by gradually changing constants. This filter 50 has for its object to simulate a near-end echo, so that a subtracter element 52 can remove signal distortion caused by the near-end echo by substracting the contribution of filter 50. In this manner a useful signal S(n) is obtained.

Another transversal filter 54 multiplies various samples of the time-shifted transmitted data A(n) by gradually changing constants. This filter 54 has for its object to simulate a far-end echo. As the far-end echoes undergo a certain frequency shift, a phase shifter corrects this shift. This phase shifter is shown in FIG. 2 in the form of a multiplier 56 which multiplies the output signals of filter 54 by $e^{j\theta}$. An element 55 producing a net delay makes it possible to have the filter 54 work under correct conditions. Thus a replica of a far-end echo is constituted, and a subtracter element 58 makes it possible to remove the signal distortion caused by this far-end echo.

Furthermore, an automatic gain control amplifier 60 makes it possible, by means of a control element 62, to maintain the level of the received data constant.

When there is a line break, the algorithms which give the phase shift values $\theta$ and the coefficients of the filters 50 and 54, are robust and adapt themselves to these new conditions. Consequently, an alarm is not raised until after too long a period of time.

To avoid this alarm delay, the invention provides a line break detection device formed by a correlation detector 80 for measuring the correlation between the transmitted data A(n) and the received data S(n) and by a threshold circuit 81. The invention is based on the following considerations. For simplification of the explanation, first the near-end echo will be discussed.

The various samples which will be discussed are complex and oversampled relative to the baud period T, so that a sample called X(n) is to be understood as having R symbols of which each symbol $X^r(n)$ is given by:

$$X^r(n) = X\left[\left(n + \frac{r}{R}\right) \cdot T\right] \quad r = 0, \ldots R-1$$

To detect the line break, the correlation between the transmitted symbols A(n) and the received symbols S(n) is examined. Therefore, the following correlation measure is evaluated:

$$I = \sum_{i=0}^{\infty} |E[A(n) \cdot \overline{S}^r(n+i)]|^2 \qquad (1)$$

where $\overline{S}^r(n+i)$ is the conjugate value of $S^r(n+i)$ and where $E[\ldots]$ is the mathematical trend level of the value in brackets.

If the data of a remote modem are received, the values S(n) are different from those transmitted and the correlation measure I is small. If, on the other hand, there is a line break, the signal S(n) becomes a replica of the signal A(n), thus the correlation becomes strong.

To determine this value without the need for too much computation, Applicants make use of intercorrelation factors of the type:

$$\xi_\tau = E[A(n) \cdot \bar{S}(n+\tau)] \quad (2)$$

and have found that the correlation measure I could be evaluated by utilizing the following formula:

$$I = \sum_{i=N1}^{N1+K-1} |\xi_i^r|^2 \quad (3)$$

In the equation (3), N1 and N2=N1+K−1 represent 6 and 8 ms, respectively. The calculation of the correlation is relevant because it is spread over the most significant 2 ms of the echo path delay time $\tau$.

The values $\xi_i^r(n)$ in which "r" represents the oversampling, are calculated with each sampling via the formula:

$$\xi_i^r(n) = (1 - \lambda) \xi_i^r(n-1) + \lambda A(n) \cdot \bar{S}_{n+i}^r$$

where $\lambda < 1$ is a constant.

Thereafter a calculation of the modulus and a single summation are performed to obtain an estimate of I:

$$I \leftarrow I + |\xi_i|^2$$

This quantity I is compared with a threshold value L. This value is independent of the echo path, i.e. of the component H(i) of its impulse response. This is due to the fact that the automatic gain control works so that the level of the received data is constant:

$$E[|S(n)|^2] = L_{cag}$$

There may be written that:

$$S^r(n) = \sum_{i=0}^{\infty} A(i) H^r(n-i)$$

$$E[|S^r(n)|^2] = \frac{\sigma^2}{R} \cdot \sum_{i=0}^{\infty} \sum_{r=0}^{R-1} |H^r(i)|^2$$

where:

$$\sigma^2 = E[|A(n)|^2]$$

Thus:

$$\sum_{i=0}^{\infty} \sum_{r=0}^{R-1} |H^r(i)|^2 = L_{cag} R / \sigma^2$$

One has:

$$I = \sigma^4 \sum_{i=0}^{\infty} \sum_{r=0}^{R-1} |H^r(i)|^2$$

In the case of a line break one finally has:

$$I = \sigma^2 L_{CAG} R$$

It is sufficient to pose:

$$L = \frac{\sigma^2 L_{CAG} R}{2}$$

Therefore, the computation procedure can be simplified.

It will be recollected that the impulse response of the echo path stretches out over 15 ms. The greater part of the energy is found in the time interval [6 ms–8 ms]. This is to say that for a 2400 Hz symbol frequency the coefficients $H^r(M)$ have a high modulus for:

$$M \in [N1; N2] N1 = 14 N2 = 19$$

The simplification proposed by the invention thus consists of computing only a single term $\xi_i^r$ for each sample (or R terms for each symbol). The calculation of the quantity I thus stretches out over:

$$K = (N2 - N1 + 1) \text{ symbols.}$$

The calculation procedure of I stored in memory 14 in the form of instructions will be the following:

Symbol $m = Kn$:

$$I \leftarrow 0$$

$$\xi_{N1}^0(m) = (1 - \lambda) \xi_{N1}^0[m - K] + \lambda A_{(m)} \bar{S}_{(m+Nl)}^0$$

$$\xi_{N1}^1(m) = (1 - \lambda) \xi_{N1}^1[m - K] + \lambda A_{(m)} \bar{S}_{(m+Nl)}^1$$

...

$$\xi_{N1}^{R-1}(m) = (1 - \lambda) \xi_{N1}^{R-1}[m - K] + \lambda A_{(m)} \bar{S}_{(m+Nl)}^{R-1}$$

$$I \leftarrow I + |\xi_{N1}^0(m)|^2 + \ldots + |\xi_{N1}^{R-1}(m)|^2$$

Symbol $m = Kn + 1$:

$$\xi_{N1+1}^0(m) = (1 - \lambda) \xi_{N1+1}^0[m - K] + \lambda A_{(m)} \bar{S}_{(m+Nl-1)}^0$$

...

$$\xi_{N1+1}^{R-1}(m) = (1 - \lambda) \xi_{N1+1}^{R-1}[m - K] + \lambda A_{(m)} \bar{S}_{(m+Nl-1)}^{R-1}$$

$$I \leftarrow I + |\xi_{N1+1}^0(m)|^2 + \ldots + |\xi_{N1+1}^{R-1}(m)|^2$$

...

Symbol $m = Kn + K - 1$:

$$\xi_{N1+K-1}^0(m) = \ldots$$

...

$$I \leftarrow I + |\xi_{N1+K-1}^0(m)|^2 + \ldots + |\xi_{N1+K-1}^{R-1}(m)|^2$$

At the instants $Kn+K-1$, I is compared with a threshold L. If $I > L$, an alarm is raised signalling a line break.

As a variant, if one only has the real portion of the received signal S, the correlation factor $\xi R_i^r$ can be used based on the equation:

$$E[A(n) Re[S^r(n)]] = E[A(n) Re[\Sigma_j A(j) H^r(n+M+j)]] = (\sigma^2/2) \cdot H^r(M)$$

where Re( ... ) is the real part of the quantity in brackets. In practice it can be calculated as follows:

$$\xi R_i^r(n) = (1-\lambda) \xi R_i^r(n-1) + \lambda A(n) Re \lambda [S^r(n+i)]$$

If the line break occurs on the side of the far-end modem, the mismatch relates only to the far-end echo. To monitor this phenomenon it is sufficient to select the terminals N1 and N2 discerningly as a function of the noise delay of the far-end echo. Correlation operations are effected simultaneously or alternately for the two types of echo.

In what has been stated above the transmit and receive clocks have been assumed to be synchronous. The possible slip of these two clocks relative to each other has no influence on the performance of the algorithm.

We claim:

1. A transmission system which includes a near-end modem and a far-end modem connected by a transmission line for duplex transmission of data samples there-between, at least one of the modems including echo suppression means for suppressing received echoes of data samples transmitted by said one modem there being an echo delay period of the transmission path between said modems; said one modem further including a line break detection device which comprises:

a correlation meter for evaluating a measure of the degree of correlation between data samples transmitted by said one modem and data samples subsequently received thereby after a time delay which is a portion of said echo delay period;

automatic gain control means for maintaining a constant level $L_{CAG}$ of data samples received by said one modem; and a threshold meter for triggering a line break alarm when the evaluated correlation exceeds a threshold level L related to said constant level $L_{CAG}$.

2. A system as claimed in claim 1, wherein said threshold level L is given by $$L = \frac{\sigma^2 L_{CAG} R}{2}$$

where $\sigma^2$ corresponds to the level of the transmitted data samples and R is the number of symbols in each data sample.

3. A local modem for transmission and reception of data samples over a transmission line to and from a remote modem, said local modem including echo suppression means for suppressing received echoes of data samples transmitted thereby, there being an echo delay period of the transmission path between said modems; said local modem further including a line break detection device which comprises:

a correlation meter for evaluating a measure of the degree of correlation between data samples transmitted by said local modem and data samples subsequently received thereby after a time delay which is a portion of said echo delay period;

automatic gain control means for maintaining a constant level $L_{CAG}$ of the received data samples; and a threshold meter for triggering a line break alarm when the evaluated correlation exceeds a threshold level L related to said constant level $L_{CAG}$.

4. A modem as claimed in claim 3, wherein said threshold level L is given by $$L = \frac{\sigma^2 L_{CAG} R}{2}$$

where $\sigma^2$ corresponds to the level of the transmitted data samples and R is the number of symbols in each data sample.

* * * * *